March 7, 1961 A. J. MEYERHOFF 2,974,309

MAGNETIC CORE LOGICAL CIRCUITS

Filed June 4, 1956

| A | B | C | D |
|---|---|---|---|
| 1 | 1 | 0 | 1 |
| 0 | 0 | 1 | 0 |
| 1 | 0 | 0 | 0 |
| 0 | 1 | 0 | 0 |

INVENTOR.
ALBERT J. MEYERHOFF

BY George Baron

ATTORNEY 2,974,309

MAGNETIC CORE LOGICAL CIRCUITS

Albert J. Meyerhoff, Wynnewood, Pa., assignor to Burroughs Corporation, Detroit, Mich., a corporation of Michigan Filed June 4, 1956, Ser. No. 589,141

4 Claims. (Cl. 340—174)

Figures 1, 2:
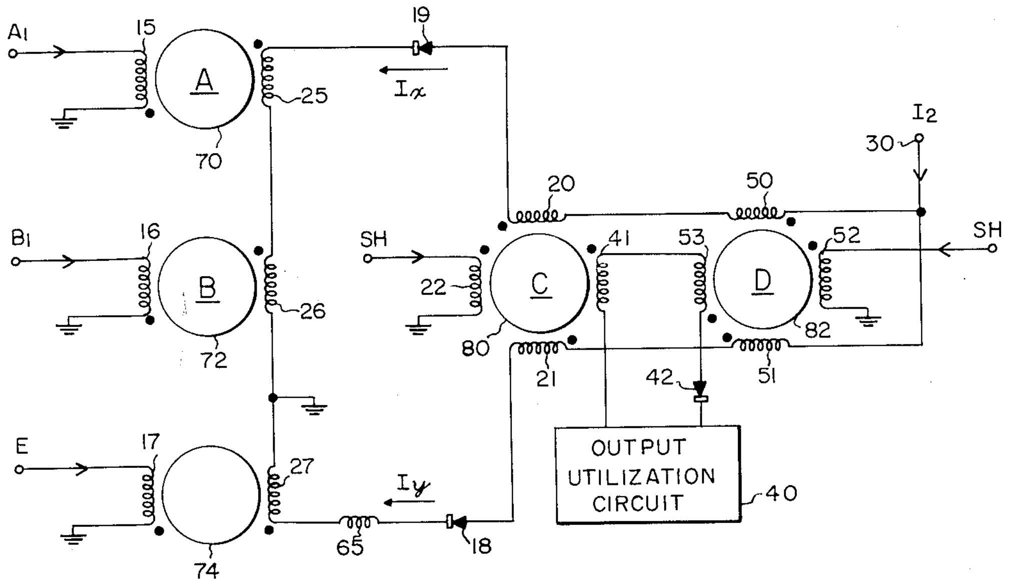

This invention relates to bistable state magnetic storage devices and more particularly to circuits which are adapted to perform logical operations on binary digits.

It is necessary in operating automatic electronic computing equipment to provide circuits for performing logical operations. For example, in the performance of arithmetic manipulations in computer circuits, logical functions are frequently encountered which indicate the mixed presence and absence of a plurality of possible input signal pulses. Although large numbers of vacuum tubes are still used in electronic computers, bistable magnetic elements are finding increased application in logical operations because of their reliability, economy and longevity.

Static magnetic storage elements in general are materials having substantially rectangular hysteresis characteristics wherein the storage elements tend to remain in a permanent magnetic remanence condition in response to the application thereto of a saturating magnetic flux. In general, the magnetic storage elements may be constructed in a number of geometries some including both closed and open paths. For example, cup-shaped, strips and toroidal shaped cores are possible. The storage states of such elements may be determined at any time by providing an interrogation saturation flux of a known polarity to windings coupled to such elements. The interrogating flux source induces a large signal voltage pulse in transformer windings about a core when the remanence condition of such a core is changed from one polarity to another. However, when the interrogating flux leaves the core in the same remanent condition, very little output signal is induced in such transformer windings about the core. Thus, the storage state is compared with the known polarity of the interrogation flux.

This invention is directed to a particular type of logical circuit termed a material-equivalence circuit. Such a circuit would include two input terminals associated with two storage cores to which are applied signal pulses and output terminals associated with the same cores for yielding an output signal under the following conditions, namely, if there is no input to either of the input terminals, or if both inputs exist at such terminals. This is equivalent to say that there is an output from the material-equivalence circuit only when the two signals applied to the input terminals are the same, namely, both exist or both do not exist.

In accordance with the present invention, bistable magnetic storage elements are operated in such a manner that the material-equivalence function is obtained reliably and quickly and with a minimum number of magnetic elements.

It is therefore, an object of the present invention to provide improved magnetic circuits for performing logical functions.

A more specific object of this invention is to provide a material-equivalence circuit utilizing magnetic binary elements.

Another object of this invention is to provide an improved material-equivalence logical circuit which is more reliable by virtue of its low sensitivity to noise impulses.

Other features and objects of the invention will be described throughout the following detailed description of the invention and illustrated in the accompanying drawings, in which:

Fig. 1 is a schematic diagram of a logical material-equivalence circuit embodying the invention; and Fig. 2 is a truth table for indicating the logic of material-equivalence.

Before proceeding with a detailed analysis of the circuit, it will be helpful to review the notation and background material used in connection with the schematic diagram. Thus, the information of opposite polarities to be stored in the binary elements is arbitrarily designated in the binary notation "1" and "0." The magnetic binary elements are shown as circles and it is assumed that these represent magnetic cores having essentially rectangular hysteresis loop characteristics. Although the magnetic elements are depicted as being toroidal in form, it is understood that the invention is not limited to elements of this particular geometry, but may include other forms of magnetic storage elements as hereinbefore mentioned.

Each of the magnetic cores is supplied with windings for producing a magnetic flux therein in response to current flow through these windings. Thus as current flows into a dotted winding terminal, the core associated with such winding will tend to store a "0." Conversely if the current flows into an undotted winding terminal, the core associated with such winding will tend to store a "1." The signals, storage conditions and currents are designated by appropriate letters supplied with subscript numbers which designate a relative time step. A definite sequence of time steps occurs during each sequential time period. For example, time steps denoted by the subscripts 1, 2 and 3, respectively, make up one sequential time period. Thus $A_1$ indicates the signal arriving at binary magnetic storage element A during the first time step of a sequential time period. Likewise $I_2$ indicates curret flow in the second step of a sequential time period.

Referring now to Fig. 1, consider the circuit operation when both input signal pulses $A_1$ and $B_1$ are present. As a result of input signal pulse $A_1$, current flows through winding 15 of element 70 in such a direction as to store a "1" in bistable element 70. Likewise current flowing through winding 16 of element 72 as a result of input signal pulse $B_1$ stores a "1" in bistable element 72. Input signal pulses $A_1$ and $B_1$ may be applied simultaneously to read-in windings 15 and 16 of magnetic elements 70 and 72, respectively, or they may be applied to the read-in windings in any desired sequence at any time prior to the flow of interrogation current $I_2$ through the branches of the material-equivalence circuit. It can be assumed that bistable element 74 is also in the "1" state of magnetic remanence as a result of preset current pulse E flowing in the proper direction through winding 17. As will hereinafter be discussed in detail, preset current pulse E may occur simultaneously with $A_1$ or $B_1$ input signal pulses or at any time preceeding the flow of interrogation current $I_2$ in the particular time sequence period under consideration.

In the second time step, interrogation current $I_2$ enters terminal 30 and divides into two branch current paths $I_x$ and $I_y$. Current $I_x$ flows through windings 50 and 20 coupled to bistable magnetic elements 82 and 80, respectively, diode 19, interrogation windings 25 and 26 on magnetic cores 70 and 72, respectively, and thence to ground. Similarly, current $I_y$ flows through windings 51 and 21 on magnetic cores 82 and 80, respectively, diode 18, air core inductor 65, interrogation winding 27 on core 74 and then to ground. It should be noted that windings 50 and 51 of core 82 are balanced but wound in phase opposition. Windings 20 and 21 are likewise balanced and wound on magnetic core 80 in phase opposition. Moreover $I_x$ and $I_y$ need not flow to ground as long as a path exists out of the circuit shown so that $I_x$ and $I_y$ can recombine to form $I_2$ again. Other circuits can be in series with the circuit at the point that is shown as being grounded.

Thus current $I_x$ flows into the dotted terminals of interrogation windings 25 and 26 of cores 70 and 72, respectively, thereby tending to switch these cores toward their respective "0" remanent states. Current $I_y$ flows into the dotted terminal of interrogation winding 27 of core 74 and tends to switch the core 74 toward the "0" state.

As magnetic elements 70 and 72 switch toward their respective "0" states, a counter E.M.F. is induced across each of the interrogation windings 25 and 26 in accordance with Lenz's law. This induced voltage is of such polarity as to oppose the flow of current $I_x$ and thereby results in a proportionate tendency for diminution or inhibition of current $I_x$. Further it should be noted that the aforementioned counter E.M.F. is the sum of the voltages induced across each of the windings 25 and 26. A counter E.M.F. is also induced across winding 27 of element 74, which counter E.M.F. results in a similar tendency for diminution or inhibition of branch current $I_y$. A voltage is also induced across inductor winding 65 as a result of current flow $I_y$, but this voltage is small in comparison to that developed across the windings associated with the magnetic cores and will be neglected in the present discussion. The function of inductor 65 will hereinafter be explained.

Thus the relative magnitudes of the branch currents $I_x$ and $I_y$ are a function of the voltages induced across the windings of the magnetic cores in each of the branches. In the logical situation under consideration, this means that current $I_x$ will be smaller than $I_y$ since the voltages induced across interrogation windings 25 and 26 are additive, and such additive induced E.M.F.'s tend to diminish the current $I_x$ more than the voltage induced across winding 27 tends to diminish current $I_y$. Assuming that output cores 82 and 80 are in their respective "0" magnetic remanence states as a result of being "read-out" in the preceding time sequence period, the effect of the unbalanced branch currents on these cores will be apparent. Current $I_y$ will tend to store a "1" in core 82 since it enters the undotted terminal of winding 51. Current $I_x$ flowing into the dotted terminal of winding 50 will tend to oppose the switching action of $I_x$, but since $I_y$ is larger than $I_x$ for the reasons hereinbefore discussed, magnetic element 82 will be switched to the "1" state. Conversely, current $I_x$ flowing into the undotted terminal of winding 20 of the alternate output core 80 will tend to store a "1" in this core but since $I_y$ is larger than $I_x$, the flux set up in core 80 as a result of current $I_y$ flowing into the dotted terminal of winding 21 overrides the switching flux set up by $I_x$ and causes core 80 to remain is the "0" state.

During the third time step, shift signal pulse current SH is applied to the dotted terminals of shift windings 22 and 52 of elements 80 and 82, respectively. The shift signal pulse is used to read out the logical result from either element 80 or 82 into the output utilization circuit 40 by way of output windings 41 and 53. Read-out windings 41 and 53 and diode 42 are polarized to pass a signal only when either element 80 or 82 is switched from its "1" state to its "0" state. Thus in the time sequence period under discussion, element 82, which had been switched to the "1" state by current $I_y$, is read out or switched to the "0" state by the shift pulse SH, thereby inducing a voltage across winding 53 and producing an output to the utilization circuit 40.

The shift signal pulse SH may also be applied to windings 22 and 52 during the first time step of the succeeding time sequence period. As mentioned previously, preset current pulse E can occur during the first time step or at any time preceding the flow of interrogation current $I_2$ in the particular time sequence period under consideration. By allowing the shift signal pulse SH and the preset pulse E to occur during the first time step, the entire logical operation can be completed in two time steps. The shift signal pulse SH, the input signal pulses $A_1$ and $B_1$, and the preset pulse E may be applied to the appropriate windings simultaneously, since diodes 18 and 19 prevent the transfer of information by way of the current paths established by windings which couple together the various magnetic elements of the material-equivalence circuit in the absence of current flow $I_2$. Thus diode 19 allows only negligible, if any, current flow in a clockwise direction around the $I_x$—$I_y$ loop and diode 18 similarly allows only negligible, if any, current flow in a counterclockwise direction. Transfer of binary information from elements 70 and 72 to elements 80 or 82 can occur only during the second time step as a result of current $I_2$ as hereinbefore described.

Assume that in the next time sequence period, input signals $A_1$ and $B_1$ do not exist. Magnetic elements 70 and 72 remain in their respective "0" remanent states. Element 74 is in the "1" state as a result of an unconditional preset signal pulse E wherein E must always occur before every $I_2$ current pulse. During the second time step, current $I_y$ flows into the dotted terminal of winding 27 and switches element 74 toward the "0" state. A counter E.M.F. is developed across winding 27 which results in the reduction of branch current $I_y$. Further, current $I_x$ flowing into the dotted terminals of windings 25 and 26 produces no switching action in cores 70 and 72 since these cores are already in their respective "0" remanent states. When the cores 70 and 72 deviate from having perfectly rectangular hysteresis loop characteristics, a slight noise voltage is induced in windings 25 and 26 which tends to reduce current $I_x$, but this noise voltage is small in comparison with the switching voltage induced across winding 27 and can be neglected in the present discussion. Thus current $I_x$ is larger than current $I_y$. The M.M.F. applied to one core 80 as a consequence of current flow $I_x$ into the undotted terminal of input winding 20 is sufficient to overcome the opposing M.M.F. applied to core 80 by the smaller current $I_y$ and, consequently, magnetic core 80 is switched to the "1" state by the resultant flux created by the difference in magnetomotive forces being applied to the core. Magnetic core 82 is caused to remain in the "0" state since the M.M.F. applied to core 82 by current $I_x$ flowing into the undotted terminal of winding 50 is sufficient to overcome the opposing M.M.F. applied to that core by the smaller current $I_y$ flowing into the undotted terminal of winding 51. During the third time step, magnetic element 80, which is in the "1" state, is switched to the "0" state by the shift pulse SH applied to winding 22, thereby inducing a voltage across winding 41 and producing an output to the utilization circuit 40.

The truth table of Fig. 2 depicts the logical function of material-equivalence. A and B are considered the input binary magnetic elements and correspond to bistable elements 70 and 72 in the preceding description of the circuit operation. The "1's" and "0's" in the A—B columns of the table represent the magnetic states of the aforesaid elements as a result of the existence or non-existence of signal input pulses $A_1$ and $B_1$. C and D represent the output magnetic elements referred to as bistable elements 80 and 82, respectively, in Fig. 1. The "1's" and "0's" of the C—D columns are indicative of the stored logical result in each of the output cores 80 and 82. As hereinbefore described, a "1" is stored in either element C or D when the two signal pulses applied to the input windings of the magnetic cores 70 and 72 are similar. According to the truth table, the application of dissimilar pulses to the input elements A and B results in no switching of the output cores C and D to the "1" state and hence no output to the utilization circuit. The material-equivalence circuit operation with dissimilar inputs will now be considered.

Assume that input signal pulse $A_1$ is applied to input winding 15 of magnetic element 70 and that input signal pulse $B_1$ is not present. Thus, magnetic element 70 is switched to the "1" state and element 72 remains in its "0" remanent state. Element 74 is in the "1" state as a result of the application of unconditional preset signal pulse E to the undotted terminal of input winding 17. During the second time step, current $I_y$ flows into the dotted terminal of winding 27 and switches element 74 toward the "0" state. The counter E.M.F. developed across winding 27 results in a reduction of current $I_y$. Further, current $I_x$ flowing into the dotted terminal of winding 25 switches element 70 toward the "0" state. The counter E.M.F. developed across winding 25 results in a reduction of current $I_x$. Magnetic core 72 is already in the "0" state and hence the flow of current $I_x$ into the dotted terminal of winding 26 tends to drive the core further into the "0" state with no substantial counter E.M.F. being generated across winding 26.

Since the counter E.M.F. developed in each of the branches is the same, currents $I_x$ and $I_y$ are equal and the material-equivalence circuit is electrically balanced. This equality of current flow through the two current paths holds only if the magnetic cores 70, 72 and 74 exhibited perfectly rectangular hysteresis characteristics. However, the non-squareness of magnetic element 72 results in the development of a small noise voltage across its winding whenever the core is driven further into the same state, i.e. from its remanence state to magnetic saturation. This noise voltage tends to unbalance the currents in the branches such that initially $I_y$ will be larger than $I_x$. This unbalance may result in a partial switching of element 82 to the "1" state; and in operations where read-out of cores 80 and 82 may not occur for many sequential time periods, element 82 may be switched closer to the "1" state by each interrogation pulse $I_2$, until a full "1" is stored therein. The next shift pulse SH applied to winding 52 would then give an erroneous output to the utilization circuit 40.

A method of compensating for the induced noise voltage generated by one of the input cores has been suggested by Messrs. Meyerhoff and Paivinen in copending application No. 472,906, filed December 3, 1954, now Patent No. 2,952,007, which has been assigned to the assignee of the instant application. This application describes the use of a monostable state inductor, such as element 65, which is inserted in the $I_y$ branch. The value of the inductor 65 is selected so that the counter E.M.F. initially induced across its winding by current $I_y$ is substantially the same as the noise voltage initially induced across winding 26 by current $I_x$. The counter E.M.F.'s developed in each of the branches are now substantially the same and the resulting currents $I_x$ and $I_y$ are equal. These equal branch currents flowing through the windings associated with magnetic elements 80 and 82 set up equal and opposing fluxes in each of said elements, thereby allowing these elements to remain in their respective "0" storage states. Therefore, the shift pulse SH produces no output to the utilization circuit 40 during the third time step.

If in the next time sequence period element 72 is switched to the "1" state by input pulse $B_1$ and element 70 remains in the "0" state due to the absence of signal pulse $A_1$, the noise voltage which is induced across winding 25 by current $I_x$ is compensated for by the counter E.M.F. developed by inductor 65 in the same manner as hereinbefore described. Thus the material-equivalence circuit is substantially balanced and the output cores 80 and 82 remain in their respective "0" states. Under these conditions, no output to the utilization circuit is produced by the shift pulse SH. Therefore, the circuit operation for dissimilar inputs agrees with the logical results depicted in the truth table shown in Fig. 2.

Bistable cores 70, 72 and 74 may be considered as inhibit cores, each performing an inhibit function in the aforementioned interrogation circuits. Bistable core 74 is always reset to its "1" state before cores 70 and 72 are interrogated to determine their storage states. Consequently when core 74 is interrogated by a current pulse $I_2$, core 74 is switched to its "0" state, such switching causing an E.M.F. to be induced in winding 27, such induced E.M.F. resulting in a current that tends to flow in winding 27 which is in opposition to the flow of current $I_y$. The current inhibiting $I_y$ is constant, whereas the current inhibiting current flow $I_x$ is not constant, but depends upon the magnetic remanent states of cores 70 and 72. Thus the induced current that inhibits current flow $I_x$ will be less than, equal to, or greater than the induced current that inhibits current $I_y$ depending upon whether both cores 70 and 72 are in their respective "0" states, only one of the two cores 70 and 72 is in the "1" state, or both cores 70 and 72 are in their respective "1" states. It is this comparison of the relative inhibitions to current flow in the $I_x$ branch and the $I_y$ branch that enables one to exploit the teachings of the instant invention and carry out the logical function of material-equivalence.

The truth table indicates that the D core or core 82 stores or represents the "and" logic. By removing core 80 and its associated windings 20, 21, 22 and 41, the material-equivalence circuit is transformed into an "and" circuit. This is readily seen in that only when the interrogating current flow $I_x$ is less than the interrogating current flow $I_y$ does the current flowing into the undotted terminal of winding 51 override the current flowing into the dotted terminal of winding 50 and switch core 82 to its "1" state. The current $I_y$ exceeds current $I_x$ only when cores 70 and 72 are in their respective "1" states prior to interrogation, because only the presence of "1's" in both cores 70 and 72 causes a greater inhibition to current flow in branch path $I_x$ than the switching of core 74 to its "0" state by interrogating current causes in branch path $I_y$. Also a "joint denial" circuit is formed by the removal of core 82 and its associated windings 50, 51, 52 and 53 so as to produce an output to the output utilization circuit only when neither $A_1$ nor $B_1$ exist.

From the foregoing description of the invention and its mode of operation, it is evident that the material-equivalence logical function may be derived advantageously with the improved binary magnetic circuit. Those features of novelty believed descriptive of the nature of the invention are therefore described with particularity in the appended claims.

What is claimed is:

1. A material-equivalence circuit comprising in combination, a circuit having two branch current paths and adapted to pass interrogating current in a single direction through said branch paths, first and second binary magnetic elements each having two stable states of magnetic remanence, each element having two windings coupled thereto, with one winding coupled respectively in each of said two branch current paths in such polarity that the current in the branch paths tends to establish opposite storage states in each element, third, fourth, and fifth binary magnetic elements each having two stable states of magnetic remanence, said third and fourth binary elements having interrogating windings associated therewith, said interrogating windings being connected in one current path, said fifth element having an interrogating winding coupled thereto and connected in the second current path, means for presetting the fifth binary element to a predetermined remanent state, means for setting said third and fourth elements respectively to one or the other of said magnetic remanent states in accordance with the nature of the signal pulses applied thereto, means for introducing interrogating current into the two branch paths, said interrogating current applying switching energy to said third, fourth, and fifth elements, the switching of said fifth element from its predetermined remanent state to its other stable state providing a fixed inhibition to interrogating current flow in the second current path, said third and fourth binary elements providing a degree of inhibition to the flow of interrogating current in said first current path which differs substantially from said fixed inhibition in said second path whenever said latter binary elements are respectively in the same remanent state at the time of interrogation, said difference in inhibition resulting in unequal current flow through said two windings coupled respectively to each of said first and second elements whereby one of said latter elements will be switched to a preselected storage state, and a shift winding and an output winding coupled to each of said first and second elements for detecting said preselected storage state in either of said latter elements and for delivering an output signal to a utilization device.

2. A material-equivalence logical circuit comprising in combination five magnetic storage elements, each element including a core of magnetic material capable of assuming alternate states of magnetic stability representative of a binary "zero" and "one" condition, the first and second of said elements each coupled for receiving binary information and each having an interrogating winding, the third said element having an input preset winding and an interrogating winding coupled thereto, means including said input winding for presetting said third magnetic element to a preselected stable state, the fourth and fifth of said elements having at least two windings each, with one of the windings of each of the fourth and fifth elements connected in series with the interrogating windings of each of the first and second elements in one branch of a parallel pair of current flow circuit branches, the other of said branches including the interrogating winding of the third element connected in series with the second of said windings of each of the fourth and fifth elements, the windings of the fourth and fifth elements in each branch being coupled to pass current tending to store signals of opposite sense in said fourth and fifth elements respectively, the interrogating windings of said first and second elements being coupled in one of said circuit branches to pass current tending to store signals of the same sense in said latter elements, and the interrogating winding of said third element in the other of said circuit branches being coupled to pass current tending to switch said third element from its preselected stable state to its other stable state, means passing current through said parallel pair of series circuits such that similar binary information stored in the first and second elements will cause unequal currents to flow in said circuits whereby either the fourth or fifth element will be switched to a predetermined storage state, and a shift winding and an output winding coupled to each of said fourth and fifth elements for detecting said predetermined storage state in either of said latter elements and for delivering an output signal to a utilization device to indicate the presence of said storage state.

3. A logic circuit comprising in combination, first and second magnetic elements each having two stable states of magnetic remanence and each adapted to be coupled to a source of binary signals for receiving and storing such signals, a third magnetic storage element having two stable states of magnetic remanence, means for presetting said third magnetic element to a preselected stable state, interrogating windings coupled to each of said elements, the interrogating windings on said first two elements being connected in series in a first of two parallel current paths and the interrogating winding on said third element being connected in the second of said current paths, means for simultaneously transmitting interrogating current in the same direction through said two current paths to apply switching current to each of said magnetic elements, the switching of said third element from its preselected stable state to its other stable state in response to said interrogating current providing a fixed degree of inhibition to the flow of interrogating current in said second path, the switching of one of said first and second elements but not both in response to said interrogating current providing a degree of inhibition to the flow of interrogating current in said first path substantially equal to said fixed inhibition in said second path, the switching of neither or both of said first and second magnetic elements as indicative of the storage of similar binary signals therein providing either substantially no inhibition to interrogating current flow in said first current path or a greater inhibition to current flow than said fixed inhibition provided in said second path by the switching of said third element, the amplitudes of the currents flowing in said parallel paths being a function of the inhibition present in each of said paths, and means for comparing said current amplitudes to ascertain the nature of the binary signals stored in said first and second elements.

4. A logic circuit comprising a first magnetic element and a second magnetic element, each element capable of assuming a predetermined first stable state in response to the presence of an input signal pulse applied thereto but retaining its other stable state in the absence of such signal pulse, a third magnetic element having two stable states of magnetic remanence, means for presetting said third element to one of its stable states, an interrogation winding coupled to each of said magnetic elements, a circuit for interrogating the stable state conditions of all said elements, said circuit including two parallel current paths, the first path carrying interrogation current through the series connected interrogation windings of said first two elements, and the second current path carrying interrogating current in a second path through the interrogation winding of said third element, the switching of said third element from its preset state to its other stable state in response to said interrogating current supplying a fixed inhibition to current flow in said second interrogating path, said first and second elements supplying a degree of inhibition to current flow in said first interrogating path dependent upon the magnetic remanent states of said latter elements at the time of interrogation, the switching of either of said first and second elements but not both supplying substantially the same degree of inhibition to current flow in said first path as is supplied by said third element in said second path, the simultaneous switching of neither or both of said first and second elements supplying either substantially no inhibition or greater inhibition to current flow than that supplied by said third element, said interrogating current dividing between said two parallel paths as a function of the inhibition presented by the magnetic elements in each of said paths, the inequality of the interrogation currents flowing through said parallel paths being indicative of the equivalence of the input signals applied to said first and second magnetic elements, and means actuated by said current inequality for detecting said equivalence condition.

References Cited in the file of this patent

UNITED STATES PATENTS

| | | |
|---|---|---|
| 2,709,798 | Steagall | May 31, 1955 |
| 2,741,758 | Cray | Apr. 10, 1956 |
| 2,742,632 | Whitely | Apr. 17, 1956 |

OTHER REFERENCES

"Magnetic Core Circuits for Digital Data Processing Systems," Proceeding of the IRE, February 1956, by D. Loev, Miehle, Paivinen, and Wylen, pp. 154–162.